A. A. BROOKS.
Steam-Cookers.
No. 196,069. Patented Oct. 16, 1877.
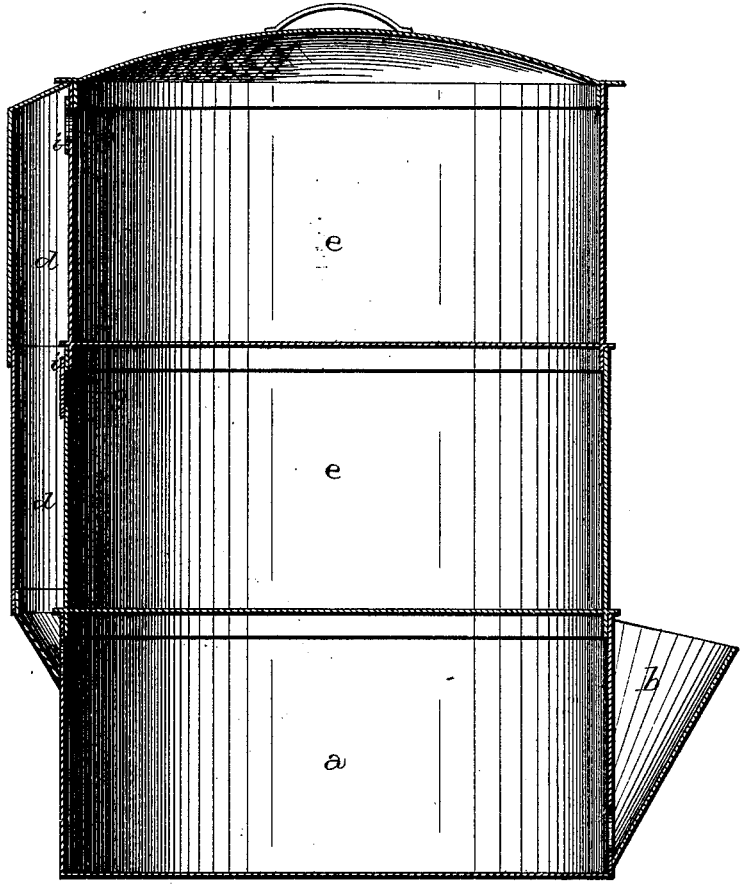
Fig. 2.
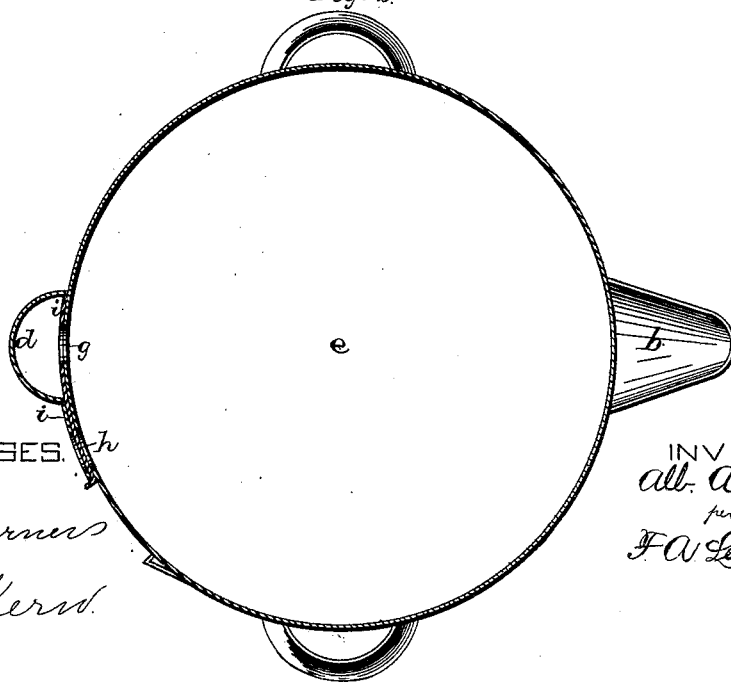
WITNESSES.
J. Wm. Garners
W. H. Kerr
INVENTOR
Alb. A. Brooks,
per
F. A. Lehmann, Atty.

UNITED STATES PATENT OFFICE.

ALBERT A. BROOKS, OF BATTLE CREEK, MICHIGAN, ASSIGNOR OF ONE-HALF HIS RIGHT TO HEMAN D. CROOKER, OF SAME PLACE.

IMPROVEMENT IN STEAM-COOKERS.

Specification forming part of Letters Patent No. 196,069, dated October 16, 1877; application filed July 28, 1877.

*To all whom it may concern:*

Be it known that I, ALBERT A. BROOKS, of Battle Creek, in the county of Calhoun and State of Michigan, have invented certain new and useful Improvements in Steam-Cookers; and I do hereby declare the following to be a full, clear, and exact description of the invention, such as will enable others skilled in the art to which it pertains to make and use it, reference being had to the accompanying drawings, which form part of this specification.

My invention relates to an improvement in steam-cookers; and it consists in connecting each one of the compartments in which articles are to be cooked with the lower compartment in which the water is boiled by an outside tube, each compartment having an opening in its side, so as to communicate with this tube, which conveys the steam from below. Just to one side of the steam-tube is made another opening through the side of each compartment, on a line with the opening into the steam-tube; and moving back and forth over these two openings is a slide, which may be made to close both openings at once, or either one that may be desired, all of which will be more fully described hereinafter.

The accompanying drawings represent my invention.

*a* represents the lower chamber, in which the steam is generated, and which may be filled or emptied through the spout *b*. Upon the opposite side of this chamber from the spout, or at any other point that may be preferred, is made an opening, *c*, through which the steam escapes into the steam-tube *d*, which extends up the sides of each one of the vessels *e*, that are used in cooking. Through the side of each vessel are made two holes, *g h*, the one, *g*, being made to communicate with the steam-tube, so as to admit the steam into the vessel upon the articles to be cooked. The other opening, *h*, is placed to one side of the steam-tube, upon a line with the other opening, and serves to allow the steam to escape through the vessel into the open air.

While the cooking is going on, the slide *i* may be moved so as to close the outer hole *h*, and to allow the steam to pass freely into the vessel.

After the article has been sufficiently cooked this slide *i* may be moved so as to close both openings; or by drawing it out to its full length the steam will be shut off from the steam-tube, and the cooking at once stopped, while what steam is in the vessel can freely escape through the hole *h* into the open air.

By means of this slide, when the article has been sufficiently cooked the steam can at once be shut off from it, so as to prevent it from being spoiled or overdone, while the other articles can be cooked as much longer as may be necessary, and this without the trouble of removing any one of them from its position.

After the slide has shut off the steam from the article being cooked, the warmth of the vessel above and below, or the steam in the steam-tube alone, will be sufficient to keep it warm as long as it remains over the fire.

If so desired, there may be two or more of these steam-tubes upon different sides.

Having thus described my invention, what I claim, and desire to secure by Letters Patent, is—

In a steam-cooker, the combination of the water-vessel *a*, cooking-vessels *e*, steam-tube *d* passing up the outside of the vessels *e*, openings *g h*, and slides *i*, whereby the steam may be cut off from any one or two of the vessels without interfering with the cooking in the other vessels, substantially as shown and described.

In testimony that I claim the foregoing I have hereunto set my hand.

ALBERT A. BROOKS.

Witnesses:
H. D. CROOKER,
M. B. RUSSELL.